Feb. 28, 1950     G. HERZOG ET AL     2,499,311
NEUTRON DETECTION

Filed March 28, 1947     2 Sheets—Sheet 1

INVENTORS
GERHARD HERZOG
KENNETH C. CRUMRINE
BY
*Daniel Stryker*
ATTORNEY

Feb. 28, 1950     G. HERZOG ET AL     2,499,311
NEUTRON DETECTION

Filed March 28, 1947     2 Sheets-Sheet 2

INVENTORS
GERHARD HERZOG
KENNETH C. CRUMRINE
BY
Daniel Stryker
ATTORNEY

Patented Feb. 28, 1950

2,499,311

UNITED STATES PATENT OFFICE 2,499,311

NEUTRON DETECTION

Gerhard Herzog, Houston, Tex., and Kenneth C. Crumrine, Tulsa, Okla., assignors to The Texas Company, New York, N. Y., a corporation of Delaware Application March 28, 1947, Serial No. 737,882

8 Claims. (Cl. 250—83.6)

This invention is concerned with the detection of neutrons in the presence of gamma rays, i. e. photons, employing proportional radiation counters, i. e. those in which the electrical discharge is dependent on primary ionization as distinguished from a counter of the Geiger-Mueller type which is independent of primary ionization.

The detection of neutrons has assumed substantial commercial importance in well logging, thickness measuring devices employed to test stills and boilers and in other applications. A proportional radiation counter may be so adapted that it is sensitive to neutrons. However, proportional radiation counters are also sensitive to gamma rays, and it is the purpose of the instant invention to provide a neutron detecting device including a proportional counter and having superior qualities in the detection of neutrons while minimizing the effect of gamma rays. Since most sources of neutrons also emit gamma rays, such selective detection of neutrons is important.

A proportional counter comprises a cathode, usually a thin walled metal tube, and an anode, usually a thin wire passing through and insulated from the tube that forms the cathode. Anode and cathode are enclosed in an envelope, for example a glass bulb, which contains a suitable gas, say methane, at relatively low pressure. The anode is maintained at a positive potential with respect to the cathode and a high resistance is placed in the circuit. If a particle capable of ionizing the gas passes into the counter, it will "trigger" with a resultant flow of current of the order of a few microamperes. This causes a large voltage drop across the resistance so that the discharge ceases after a short period of time. When the discharge ceases, the counter is again in condition to register the passage of an ionizing particle.

Neutrons, per se, do not cause ionization within the counter. Consequently, in order to detect neutrons with a proportional counter, it is necessary to utilize an intermediate reaction by which the neutron releases an ionizing particle, say an alpha particle, which in turn acts on the gas within the counter. Such reactions are known to occur when a neutron strikes lithium or boron, and a proportional counter can be made sensitive to neutrons by lining the wall of the counter with one or more of those elements or their compounds. Similarly the envelope of the counter can be filled with a gas containing a compound of lithium or boron, say boron trifluoride.

As indicated above, the action of the neutron upon the lithium or boron brings about the emission of mostly alpha particles. Gamma rays, on the other hand, release electrons within the counter. The specific ionization of alpha rays is much greater than that of electrons, so that the maximum charge pulses in a proportional counter due to neutrons are much larger than those due to gamma rays. By selecting the pulse size by the use of suitable electric circuits, one can therefore distinguish between the neutrons and the gamma rays.

As a result of our investigations, we have developed improvements which permit increased efficiency in neutron counting with a minimum interference from gamma rays. Gamma rays affect proportional counters to only a small extent with low voltages across the electrodes, but their influence increases with increasing voltage. The voltage across the electrodes of a counter in a given case should be limited to a value at which the influence of the gamma rays is not excessive. However, in accordance with our invention, the efficiency of separately detecting neutrons originating at a source which simultaneously emits gamma rays is increased by decreasing the proportion of gamma rays to neutrons introduced to a proportional counter and increasing the voltage across the counter, thereby increasing the counting rate for neutrons. The proportion of gamma rays to neutrons arriving at the counter may be decreased by interposing between counter and source a shield through which the neutrons pass preferentially or by increasing the distance between counter and source.

In the preferred practice of our invention, we employ at least two radiation counters disposed at different distances from the source of neutrons and gamma rays and increase the efficiency of neutron detection in the remote counter by increasing the voltage across this counter (or conversely by using a higher amplification on the output of the remote counter).

Thus, in the practice of our invention, we may employ multiple counters disposed at different distances from the source and operated at increasing voltages as the distance from the source increases.

The counters may have a common cathode and separate anodes, but we prefer to employ a common anode with separate cathodes. In this latter modification each cathode may have a different voltage with respect to ground as the result of the interposition of batteries between cathodes and ground. Pulses detected by the apparatus are taken from the common anode through a single preamplifier, the arrangement being equivalent to one long counter whose neutron detection efficiency increases with increasing distance from the source.

These and other aspects of the invention are described in detail hereinafter with reference to the accompanying drawings in which Fig. 1 is a graph illustrating the increase in counting rate for neutrons with applied voltage and also the effect of applied voltage on the counting rate for gamma rays;

Figure 1:
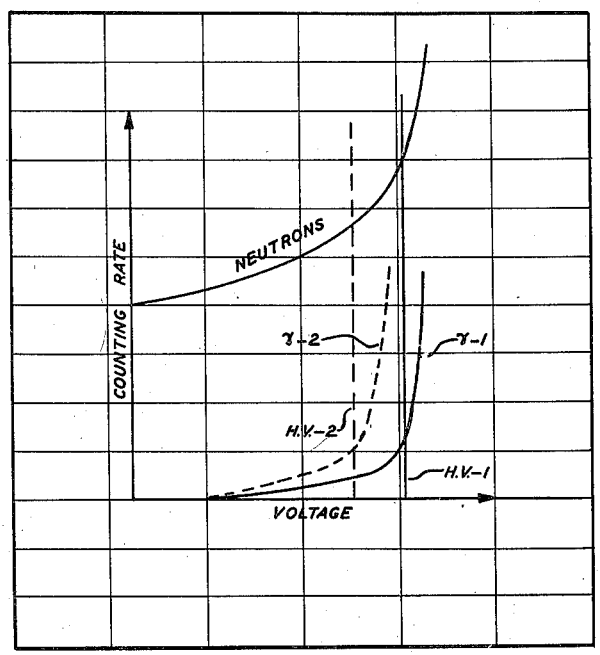

In Fig. 1, the counting rates for neutrons and gamma rays are plotted against voltage impressed across a counter between anode and cathode. It will be observed that the counting rate for neutrons increases with the applied voltage. Gamma rays are counted to a very small extent for low voltage, but their influence increases with increased voltage. The applied voltage therefore has to be limited to a value where the influence of gamma rays is not too large, otherwise the accuracy in neutron counting is largely vitiated.

If the intensity of the gamma rays is reduced while the neutron intensity remains the same, the gamma ray curve, gamma—2, shifts to the position gamma—1. As gamma ray intensity at the counter decreases, higher voltage can be applied across it, with improved efficiency in neutron counting.

Figure 2:
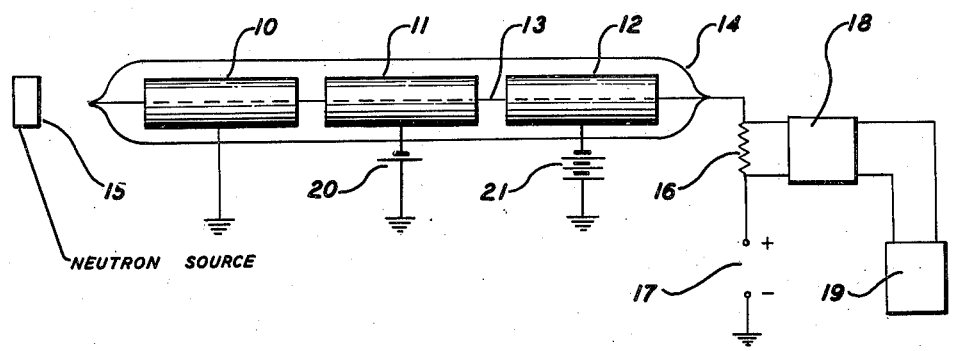
Fig. 2 is a schematic diagram of three proportional counters arranged for the practice of the invention and provided with a common anode.

Advantage of the foregoing phenomena is taken in the apparatus of Fig. 2, wherein a proportional counter comprising three sections with tubular cathodes 10, 11, 12 provided with a single anode wire 13 (disposed coaxially through all three cathodes) is mounted in an envelope 14. A neutron source 15, for example a mixture of radium and beryllium, is placed nearest the counter 10. Such a neutron source, like most practical sources, gives off both neutrons and gamma rays.

The anode is connected through a high resistance 16 to a source 17 of high voltage direct current, the other side of the current source being connected to ground. A preamplifier 18 of conventional type is connected across the resistance, and its output is sent to additional amplifying and recording equipment 19, likewise of conventional type.

The counter cathode 10 nearest the neutron source is connected directly to ground. Cathode 11 of the next nearest counter section is connected to ground through a supplementary direct current source 20, which acts to increase the potential across the counter. The most remote cathode 12 is connected through a still larger D. C. voltage source 21 to ground. The arrangement is such that the counter section nearest the neutron source has the lowest voltage while those more remote have increasingly higher voltages and consequently higher counting efficiency for neutrons. The apparatus of Fig. 2 may, if desired, be incorporated in apparatus for measuring thickness by radiation screening effect or in the logging head of a neutron logger employed for detecting differences in radiations from strata penetrated by a bore hole in the ground. Thus the neutron source and the several counter sections may be mounted in an oil well logging head in the geometrical relationship shown in Fig. 2.

Figure 3:
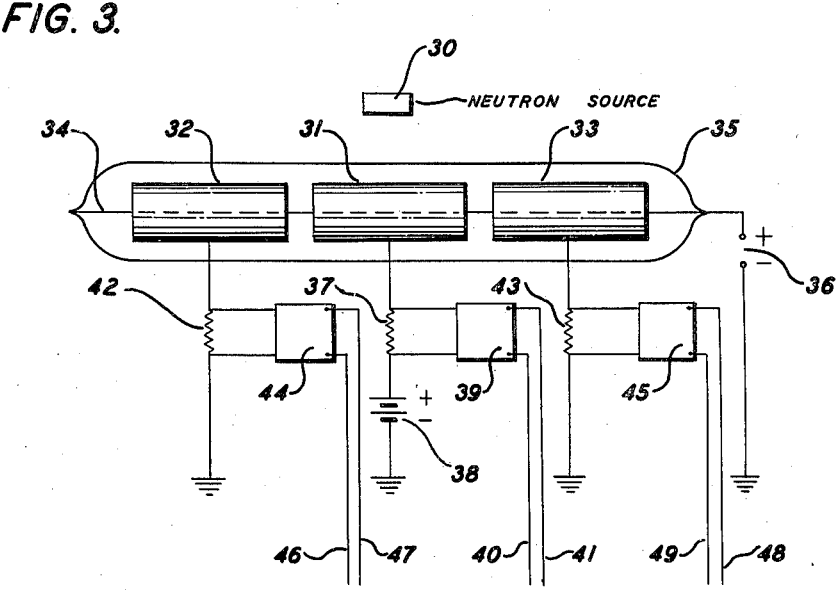
Fig. 3 is a schematic diagram illustrating a further modification of the invention.

In the apparatus of Fig. 3, the neutron source 30, for example a mixture of radium and beryllium, is placed nearest the center cathode section 31 of a counter provided with cathode sections 32, 33 on the two ends of the central section. The three counter sections have a common anode wire 34 which passes coaxially through the three tubular cathodes. All three cathodes are enclosed in a conventional envelope 35.

The anode 34 of the apparatus is connected to a high voltage D. C. power source 36, the other side of which is connected to ground. The cathode of the central section of the counter is connected through a resistance 37 and an auxiliary D. C. power source 38 to ground, the function of this source being to reduce the voltage applied across the central section of the counter. A conventional preamplifier 39 is connected across resistance 37 of the central cathode. The output of the preamplifier is connected to conventional amplifying and recording equipment (not shown) through leads 40, 41.

The purpose of the apparatus of Fig. 3 is to determine the difference of the counting rate of the central counter 31 and the sum of the counting rates of the two outer counters 32, 33. With this in mind, the cathodes of the two outside counters 32, 33 are connected respectively to ground through resistances 42, 43, both of which have preamplifiers 44, 45 respectively connected across them, the output of these two amplifiers being sent to additional amplifying and recording equipment through leads 46, 47 and 48, 49 respectively.

The arrangement of Fig. 3 is adapted for use where the pulses are sent from the cathodes to the individual preamplifiers. The difference in the counting rate between the central counter 31 and the sum of the counting rates of counters 32 and 33 may be determined by combining the outputs of the amplifiers 44 and 45 in association with the counters 32 and 33. It will be apparent therefore that the outside counters 32 and 33 of the device of Fig. 3 could be connected, if desired, to a common preamplifier.

As already indicated, the higher counting rate for the counter which is remote from the source of neutrons and gamma rays can be obtained through an increase of the amplification factor employed on the output of this counter. This may be accomplished either by employing separate amplifiers for two counter sections, with different amplification factors on both, or a multi-stage amplifier can be employed with the counter section farthest from the source connected to a stage having higher gain.

Alternatively the higher comparative counting rate of the remote counters may be obtained by decreasing the efficiency of the proximate counter by reducing the cathode voltage thereof with respect to the cathode voltage of the remote counters. This may be accomplished as shown in Fig. 3 by the auxiliary D. C. power source 38 which is connected through the resistance 37 to the cathode of the control counter 31 thus reducing the voltage applied across this section closest to the neutron source.

Figure 4:
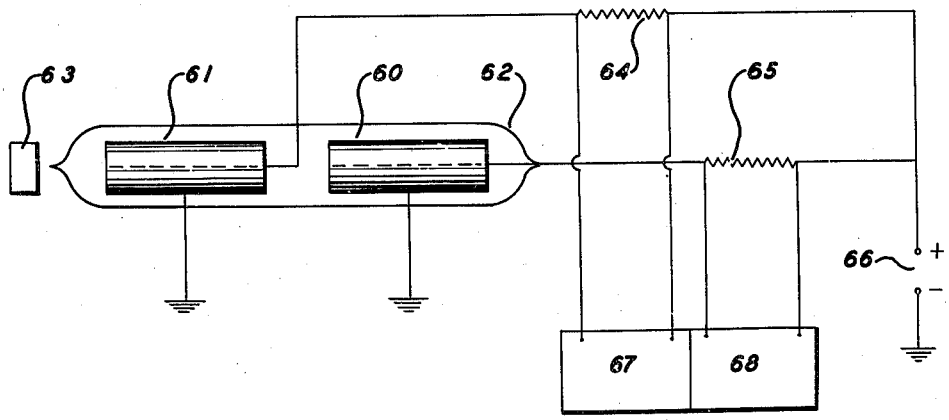
Fig. 4 is a schematic diagram illustrating the practice of the invention with a pair of counters maintained at equal voltage but with different gains applied in the amplification of the counter outputs.

The apparatus of Fig. 4 is constructed in accordance with the foregoing principles and comprises two individual counters 60, 61 disposed coaxially within an envelope 62 and having separate anodes and cathodes. A neutron source 63 is disposed coaxially nearest the counter 61. The cathodes of both counters are connected to ground. Their anodes are connected respectively through high resistances 65, 64 to a D. C. high voltage source 66, the other side of which is connected to ground to complete the circuit for the cathodes. Thus, the counter 61, which is nearer the neutron source, has its anode connected to the resistance 64. An amplifier, for example a preamplifier 67, is connected across this resistance. The anode of the other counter 60 is connected to the high voltage source through the resistance 65. The input of an amplifier 68, for example a preamplifier, is connected across this resistance, the arrangement being such that the gain applied to the output of the counter 60, which is remote from the neutron source, is higher than the gain applied to the output of the other counter close to the neutron source.

If desired, the amplifiers 67, 68, which are shown as separate amplifiers, may be simply different stages of the same amplifier, as already described.

The invention provides a simple method and apparatus for increasing the efficiency of neutron detection, which can be employed with advantage in neutron well logging, thickness measurement and in other commercial applications of the neutron detection principle.

We claim:

1. In neutron detection apparatus having a source of neutrons which simultaneously emits gamma rays, the combination which comprises at least two proportional counters spaced at different distances from the source, means for applying an actuating voltage across the counter near the source and means for applying a higher actuating voltage across the counter remote from the source.

2. Apparatus according to claim 1 in which the counters are provided with a common anode and individual cathodes.

3. In a process for the detection of neutrons from a source which simultaneously emits gamma rays, involving the introduction of gamma rays and neutrons into at least two radiation counters, the improvement which comprises disposing the counters at different distances from the source, applying actuating voltages across both counters, and amplifying the resultant current flows across both counters by different factors, the amplification of the current across the counter remote from the source being greater than the amplification of the current across the counter near the source, whereby the efficiency of neutron detection is increased.

4. In apparatus for neutron detection, the combination which comprises a neutron source which emits both neutrons and gamma rays, a radiation detector capable of detecting both neutrons and gamma rays and comprising a plurality of proportional counters each disposed at a different distance from the source, means for applying across a counter near the source an actuating voltage, and means for applying across a counter farther from the source a higher actuating voltage.

5. In apparatus for neutron detection, the combination which comprises a neutron source which emits both neutrons and gamma rays, radiation detector capable of detecting both neutrons and gamma rays and comprising a plurality of proportional counters each disposed at a different distance from the source, means for amplifying the output of a counter near the source, and means for amplifying to a greater extent the ouput of a counter remote from the source.

6. In neutron detection apparatus having a source of neutrons which simultaneously emits gamma rays, the combination which comprises at least two proportional counters spaced at different distances from the source, means for applying an actuating voltage across each of the counters, means for amplifying the output of each of the counters, and means for increasing the counting rate of the counter remote from the source.

7. In neutron detection apparatus having a source of neutrons which simultaneously emits gamma rays, the combination which comprises a plurality of proportional counters spaced at different distances from the source, means for applying an actuating voltage across each of the counters, means for amplifying the output of each of the counters, and means for progressively increasing the counting rates of the counters progressively distant from the source.

8. In a process for the detection of neutrons from a source which simultaneously emits gamma rays, involving the introduction of neutrons and gamma rays into at least two radiation counters, the improvement which comprises disposing the counters at different distances from the source, applying actuating voltages across both counters, amplifying the current across both counters, and controlling the voltages and amplification so that the counting rate at the counter remote from the source is greater than that of the counter near the source.

GERHARD HERZOG.
KENNETH C. CRUMRINE.

REFERENCES CITED

The following references are of record in the file of this patent:

UNITED STATES PATENTS

| Number | Name | Date |
| --- | --- | --- |
| 2,390,433 | Fearon | Dec. 4, 1945 |